United States Patent [19]

Crossland et al.

[11] Patent Number: 4,793,670
[45] Date of Patent: * Dec. 27, 1988

[54] DYNAMIC HOLOGRAM RECORDING

[75] Inventors: William A. Crossland, Harlow; Peter W. Ross, Stansted; Neil Collings, Harlow, all of England

[73] Assignee: STC PLC, London, England

[*] Notice: The portion of the term of this patent subsequent to Mar. 31, 2004 has been disclaimed.

[21] Appl. No.: 882,545

[22] Filed: Jul. 7, 1986

[30] Foreign Application Priority Data

Jul. 18, 1985 [GB] United Kingdom ............... 8518155

[51] Int. Cl.$^4$ .......................... G02F 1/13; G02H 1/04
[52] U.S. Cl. ................................ 350/3.64; 350/3.61; 350/320; 350/351
[58] Field of Search ................. 350/3.64, 331 T, 3.69, 350/3.74, 3.72, 3.62, 374, 386, 358, 3.61, 351, 320; 307/425, 426, 427, 428

[56] References Cited

U.S. PATENT DOCUMENTS

| | | | |
|---|---|---|---|
| 3,891,975 | 6/1975 | Deml et al. ......................... | 350/3.69 |
| 4,279,152 | 7/1981 | Crossland ......................... | 350/331 T |
| 4,284,324 | 8/1981 | Huignard et al. .................. | 350/3.64 |
| 4,619,501 | 10/1986 | Armitage ............................ | 350/356 |
| 4,653,857 | 3/1987 | Crossland et al. ................. | 350/3.61 |
| 4,655,554 | 4/1987 | Armitage ............................ | 350/386 |

FOREIGN PATENT DOCUMENTS 0152187 8/1985 European Pat. Off. .

OTHER PUBLICATIONS

I. C. Khoo et al., "The Mechanism and Dynamics . . . Crystal Films", IEEE Journal of Quantum Electronics, vol. QE21, No. 4, 4/85, pp. 329-335.
I. C. Khoo et al., "Nanosecond-Laser-Induced . . . Liquid Crystals", Optics Letters, vol. 9, No. 7, Jul. 1984, pp. 285-287.
I. C. Khoo et al., "Infrared to Visible Image . . . Crystal Film", Conference on Lasers and Electro-Optics, May 21-24, 1985, pp. 206-207.
Ye Peixuan, et al., "Four-Wave Mixing . . . Liquid Crystals", Journal of Optical Society of America, vol. 7, No. 6, 6/80, pp. 638-639.
R. A. Fisher, "Optical Phase Conjugation", 1983, pp. 19, 20, 48-62, Academic Press, New York.

Primary Examiner—Bruce Y. Arnold
Assistant Examiner—Martin Lerner
Attorney, Agent, or Firm—Lee & Smith

[57] ABSTRACT

Optical four wave mixing is provided by interfering two waves on a liquid crystal layer (1) temperature stabilized just beneath its nematic/isotropic phase change transition temperature. The liquid crystal incorporates a guest dye to absorb the light producing a holographic thermal image which is accompanied by a holographic phase image. Once this phase image starts to build up it is illuminated with a 'third wave' of light that is not absorbed so as to produce the required holographically diffracted 'fourth wave'.

2 Claims, 1 Drawing Sheet

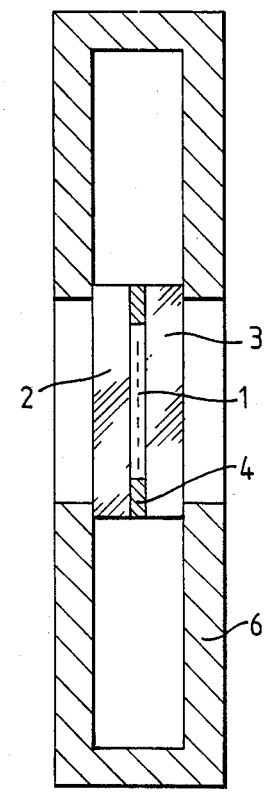

DYNAMIC HOLOGRAM RECORDING

BACKGROUND OF THE INVENTION

This invention relates to dynamic hologram recording. A dynamic hologram recording device is a kind of optical four-wave mixer. In its 'recording' mode two optical waves are caused to interfere in the device so as to produce a modification of its optical properties and form a (temporary) holographic record of the interference pattern. In its 'playback' mode a third wave, not necessarily of the same frequency, is arranged to be incident upon the device where it interacts with the recorded hologram to produce a diffracted fourth wave.

One example of a four wave mixer is provided by the bismuth silicon oxide mixer in which the recording is effected electronically insofar as the recording results from the local trapping of photo carriers in the crystal medium. An alternative form of mixer in which the recording results from thermal effects is described in the specification of U.S. patent application Ser. No. 697,208 filed Feb. 1, 1985, now abandoned. A description of this alternative form of mixer has subsequently been published (Nov. 13, 1985) in United Kingdom patent specification No. GB 2154024A to which attention is directed. The present invention is concerned with modifications to the method of providing optical four-wave mixing that is described in that patent specification.

SUMMARY OF THE INVENTION

In the specific description of that patent specification it is contemplated that the device shall be operated cyclically with three distinct periods comprising (1) temperature stabilisation, (2) exposure and development of the holographic image, and (3) illumination of the hologram with the 'third wave' so as to produce the requisite 'fourth wave'. Specific mention is also made of the desirability of adopting a cell construction for its active medium, which is constituted by a liquid crystal layer, in which thermal mass was minimised so as to diminish the effect of heat spreading. It has since been found that optical four-wave mixing can be achieved in a time-scale short enough for the effects of heat ducted from one part of the active layer to another by way of the cell walls to be insignificant. Under these conditions it is advantageous to operate such a device in a regime in which the exposure and development of the hologram is overlapped in part by the interrogation of that hologram with the third wave.

According to the present invention there is provided a method of providing optical four-wave mixing, wherein a liquid crystal layer incorporating a guest pleochroic dye is thermally stabilised to a predetermined temperature, wherein two waves for which the dye is selectively absorbing are interfered in the layer to produce a thermal hologram and concomitant phase hologram, and wherein a third wave to which the dye is substantially transparent is employed to illuminate the layer so as to interact with the phase hologram to produce a holographically diffracted fourth wave, characterised in that illumination with the third wave commences after commencement of illumination with the first and second waves while that illumination with the first and second waves continues, and in that it terminates not before termination of illumination with the first and second waves.

In a preferred arrangement, the terminal stabilisation referred to above is to a temperature not more than one degree Celsius beneath its nematic/isotropic phase change transition temperature.

Operation of the device relies upon the fact that the refractive index of a homogeneously aligned, liquid crystal for light polarised in the plane of the molecular alignment direction is typically a relatively strong function of temperature in the temperature range immediately beneath the nematic/isotropic phase change temperature. In certain instances, particularly where the liquid crystal incorporates a chiral component and/or the alignment directions at the two major surfaces of the liquid crystal are inclined at an angle to each other, this effect may be augmented by the effects of the temperature dependence of tilt angle for molecular alignment systems producing non-zero tilt angles.

BRIEF DESCRIPTION OF THE DRAWING

There follows a description of a four-wave mixer, and of its operation in a manner embodying the invention in a preferred form, in which reference is made to the accompanying drawing which depicts a schematic cross-section of the device.

DETAILED DESCRIPTION OF THE PREFERRED EMBODIMENT

The heart of the device is provided by a thin layer 1 of liquid crystal. This is typically about 10 microns thick and may for instance be 4-cyano-4'-N-hexylbiphenyl. The layer is confined by front and rear transparent sheets 2 and 3 and an edge seal 4, which co-operate to form a hermetically sealed envelope or cell for containing the liquid crystal layer.

The active (operative) area of the cell can be quite small, typically no more than 10 mm in diameter. If it is capable of a resolution of 5 microns this area provides a theoretical capacity approaching $3 \times 10^6$ bits, whereas if 1 micron resolution is achieved this figure is increased to approaching $10^8$ bits. The liquid crystal layer needs to be capable of being brought to a specific temperature, and so it needs to be mounted in some form of thermal stabilisation chamber. Conveniently this takes the form of a transmitted light heating freezing stage such as one marketed by Linkam Scientific Instruments Ltd. (Carshalton-Beeches, Surrey, England). Such a stage is depicted at 6, its walls being fitted to the front and rear sheets 2 and 3 of the liquid crystal cell to define a toroidal chamber and which works by conduction from a temperature-regulated block of metal for regulating the liquid crystal temperature. Thermal conductivity of the sheets 2 and 3 is significant in obtaining good thermal stabilisation of the liquid crystal layer, and hence sapphire may be preferred to glass provided that adequate account is taken of the birefringence of sapphire. In order to minimise wavefront distortion these sheets need to be of good optical quality.

The liquid crystal layer is to respond to interfering beams of incident light of a first wavelength so as to form a thermal image of the intensity distribution the resulting interference pattern of that light. The light is pulsed coherent light, which may for instance be from a ruby laser. The liquid crystal layer therefore incorporates a pleochroic guest dye with an aborption band matched with this wavelength in order to provide efficient absorption of the incident radiation. This dye is required to be substantially transparent to light of the third wave with which the layer is interrogated in order to generate the 'fourth wave'.

One way of achieving the requisite contrast between transparency to the third wave and absorption of the first and second wave is to employ a different wavelength for light of the third wave from that used for light of the first and second waves. The use of a different wavelength is however not essential for pleochroic dyes are available which will produce an acceptable contrast providing an absorption of 30% for one plane of polarisation and only 0.2% for the orthogonal plane. This means that the same wavelength can, with appropriate choice of polarisation planes, be employed for all four waves.

In operation of the device, illumination of the liquid crystal layer commences once that layer has been adequately stabilised to the required temperature. This proceeds without illumination with the third wave until the resulting absorption of light by the dye has caused local heating, which is transferred to the liquid crystal molecules, to produce localised reductions of birefringence. Typically this will begin to be noticeable after a few tens of nanoseconds. The first and second waves are maintained beyond this point in time in order to increase the depth of spatial modulation (fringe 'visibility') in the liquid crystal. A limit to the length of illumination with the first and second waves is set by the effects of heat spreading within the liquid crystal layer. To achieve a resolution of 1 micron this maximum period will typically be approximately 20 $\mu$secs whereas if a 5 micron resolution is acceptable this period will be extended to approximately 500 $\mu$sec. For reasons of obtaining maximum signal to noise ratio in the fourth wave, illumination with the third wave should be for as long as possible while acceptable resolution is maintained in the thermal (phase) image produced in the liquid crystal layer by the interference effects of the first and second waves. Illumination with the third wave therefore commences shortly after commencement of illumination with the first and second waves. This gives time for the thermal image to develop to an appreciable extent. Clearly there is no advantage in terminating illumination with the third wave before the termination of the illumination with the first and second waves, but on the other hand it will also be clear that, if it is maintained after illumination with the first and second waves has ceased, it can only be maintained for a limited period before any advantage in improved signal to noise is more than offset by a deterioration in resolution resulting from progressive heat spreading.

One particular application of the present invention is in the recording of holograms in joint transform correlator described in the specification of U.S. patent application Ser. No. 697,207, assigned to a common assignee, and filed Feb. 1, 1985, now abandoned. A description of this correlator has subsequently been published (Aug. 29, 1985) in United Kingdom patent specification No. GB 2154092A to which attention is also directed.

We claim:

1. A method of providing optical four-wave mixing, wherein a liquid crystal layer incorporating a guest pleochroic dye is thermally stabilised to a predetermined temperature, wherein two waves for which the dye is selectively absorbing are interfered in the layer to produce a thermal hologram and concomitant phase hologram, and wherein a third wave of the same wavelength as that of said two interfering waves to which the dye is substantially transparent is employed to illuminate the layer so as to interact with the phase hologram to produce a holographically diffracted fourth wave, characterised in that illumination with the third wave commences after commencement of illumination with the first and second waves while that illumination with the first and second wave continues, and in that it terminates not before termination of illumination with the first and second waves.

2. A method of providing optical four-wave mixing according to claim 1, wherein said predetermined temperature is not more than one degree Celsius beneath the nematic/isotropic phase change transition temperature of said liquid crystal layer incorporating a guest pleochroic dye.

* * * * *